UNITED STATES PATENT OFFICE.

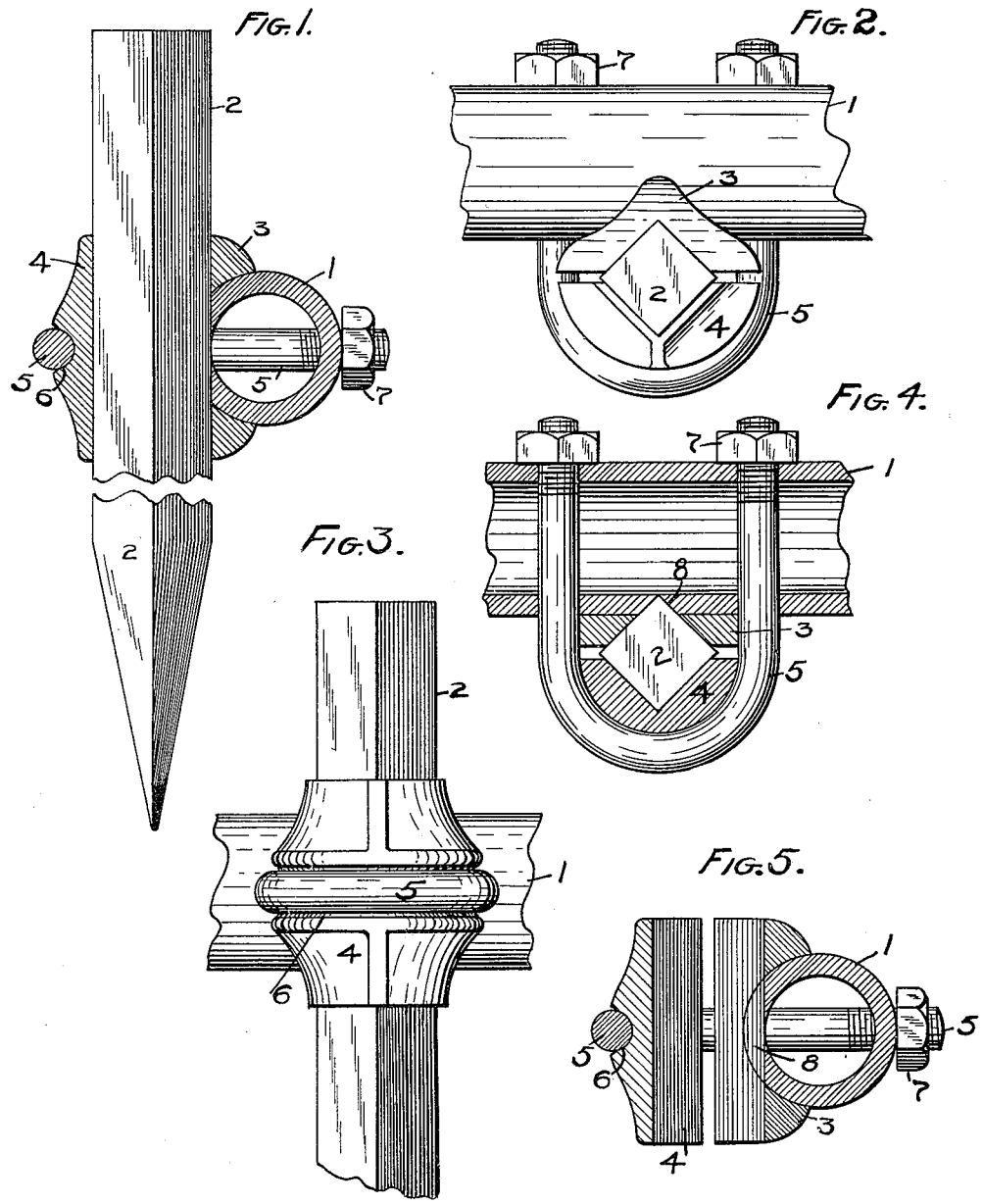

WILLIAM MONROE FRANK, OF SPRINGFIELD, OHIO.

SPIKE-TOOTH HARROW.

SPECIFICATION forming part of Letters Patent No. 650,676, dated May 29, 1900.

Application filed February 3, 1900. Serial No. 3,918. (No model.)

*To all whom it may concern:*

Be it known that I, WILLIAM MONROE FRANK, of Springfield, county of Clark, and State of Ohio, have invented a certain new and useful Spike-Tooth Harrow; and I do hereby declare that the following is a full, clear, and exact description thereof, reference being had to the accompanying drawings, in which like figures refer to like parts.

The object of this invention as herein disclosed is to provide practical and economical means for attaching spike harrow-teeth to harrows whose frames are made of pipes or tubes, generally known as "pipe-harrows" or "frame-bars," round or partially round. By securing the tooth to the side of the pipe the latter is in no wise weakened, and while it is not new to secure spike-teeth to the side of the frame-bar of a harrow means for effectually securing such a tooth to the side of a pipe in pipe-harrows has never been invented, so far as I am aware. Aside from the advantage above mentioned of my invention another decided advantage consists in the ability with my tooth-fastening to attach teeth of varying sizes without changing the harrow-fasteners in any wise. In the means above described of inserting the tooth through the pipe vertically only one size of tooth can be used with the same pipe or fasteners, and the size of such tooth must be relatively small, so as not to require such large openings through the pipe as to render it absolutely useless. With my invention a half-inch or five-eighth-inch or inch tooth can be attached to any pipe-harrow, as desired, and the strength of the frame will not be diminished or affected.

One feature of my invention also consists in the arrangement of clips whereby great bearing-surface is provided, which when the clips are clamped together absolutely prevents the vertical movement of the teeth. Another advantage of such clip arrangement is their increased resistance to the twisting movement of the teeth when under strain while the harrow is in use. Likewise the arrangement herein set forth prevents any lateral movement of the teeth. All these advantages accrue from my said invention without any increase in the cost of manufacture. These, with the other features of my invention, will more fully appear from the accompanying drawings and the description following of one form of device embodying my said invention, and the scope of said invention will be understood from the claims following said description.

In the drawings herein shown to illustrate the nature of my invention, Figure 1 is a central vertical section through a pipe of a harrow-frame and adjacent tooth-fastening, the tooth being centrally broken away. Fig. 2 is a plan of a section of a pipe of a harrow-frame and a tooth and fastening. Fig. 3 is an elevation of a section of a pipe of a harrow-frame with the fastener and the upper part of a tooth in place. Fig. 4 is a horizontal cross-section of the fastening with a portion of the pipe-frame shown in section and the tooth shown in plan. Fig. 5 is the same section as is shown in Fig. 1, with the tooth removed.

Referring to the details of the device herein shown for the purpose of illustrating this invention, 1 is a pipe forming a part of the frame of the pipe-harrow. The general arrangement and construction of pipe-harrows is well known to all acquainted with the art. Pipes form a harrow-frame of unusual strength when compared with its weight, and therefore it is much in favor, because of its convenience in use, for harrows while in actual use and also in transportation must be handled considerably.

2 represents a spike harrow-tooth like those now in general use, being smaller and sharp as compared with the old-fashioned iron spike-tooth, so that they enter the ground with less weight than the old teeth that were larger and blunter.

I herein show a pair of clips—an inside clip 3 and an outside clip 4—whose adjacent faces are provided with vertical rectangular grooves, as seen in Fig. 5 and indicated in Figs. 2 and 4, to receive the harrow-tooth. As seen in Figs. 2 and 4, one angular half of the tooth fits in the groove in the inside clip 3 and the other half of the tooth in the groove of the outer clip 4. These grooves extend for the whole vertical length of the clips and combined practically surround the tooth, and therefore present a very extensive frictional surface-bearing against the tooth when they are clamped together. Said clips are clamped together, and also against the pipe, by means of a U-shaped clamp 5, whose two arms extend diametrically and horizontally through the pipe and through grooves in the side of the inner clip 3, as is indicated in Figs. 2 and 4, and lies in the groove 6, extending centrally and horizontally about the outer clip 4. The two ends of said U-shaped clamp are threaded to receive the nuts 7, whereby the clamping of the parts is effected. The outer clip 4 is preferably ribbed and cut away in a manner well-known in the art of metal manufacture, so as to diminish its weight and the amount of metal used without diminishing its strength. The inner clip 3 has a curved face adjacent to and bearing against the pipe 1 and is so curved as to bear against said pipe at all points. By reason of this construction or form said clip has an upper and a lower extension partially surrounding the pipe that reaches almost to the vertical center thereof, as is shown in Figs. 1 and 5.

Midway between the holes through the pipe 1 for the reception of the two arms of the U-shaped clamp 5 a vertical slot or groove 8 is made in the surface of the pipe over which the clip 4 operates, as is shown clearly in Figs. 4 and 5 and indicated in Fig. 1. This vertical slot extends in the form here shown barely through the wall of the pipe. The purpose of this groove is to receive the angular vertical edge of the tooth. Therefore in such construction as appears in Figs. 4 and 5 the tooth extends through the middle part of the clip 3 and into the notch or slot in the pipe. The function of this slot or notch is to give added rigidity to the tooth-holding and to coöperate with the clamp 5 in preventing lateral movement of the tooth. This groove or notch is only a preferable construction and is not needed, because the clamp 5 in itself will prevent lateral movement of the tooth; but such arrangement is preferred in order to obtain absolute rigidity of the tooth-fastening.

While it may seem that the introduction of the four holes for the passage of the clamp and the addition of the groove or notch 8, if that be preferred, would tend to weaken the pipe, such tendency is overcome by the fact that the clip 3 envelops about half of the pipe and its extension above and below, coupled with the clamping action of the clamp on the round form of the pipe. The fastening, in other words, adds strength to the pipe that substantially equals the reduction in its strength caused by said holes. The chief strain to which said pipe is subjected while the harrow is in use is the torsional strain. It is observed that with this fastening the strain will be first transmitted to the clips, the bearings being against the lower end of the bearing-face of the inner clip 3 and the upper end of the bearing-face of the outer clip 4. The strain from the lower part of the inner clip 3 is then transmitted to the curved pipe-surface, against which said lower end of the clip bears and which is imperforate and strong. The strain against the upper end of the outer clip is transmitted to the clamp 5, and from said clamp the strain is transmitted to the pipe; but since said clamp has two arms and extends centrally through the pipe the strain therefrom to the pipe is well distributed. This arrangement renders the fastening device above described extremely more durable and strong than the construction with which I have heretofore been acquainted, wherein the tooth extends vertically and centrally through the pipe, for in this latter arrangement nothing in the fastening tends to overcome the weakening of the pipe by the introduction of the two large holes for the reception of the tooth, and the result is a frail structure. To obtain ample frictional surface in the clips against the tooth, the clips are preferably longer than the diameter of the pipe.

While the drawings and description illustrate my invention in a pipe-harrow, I do not limit the invention to a pipe-harrow, as the tooth-fastener shown and described is equally useful in a harrow wherein the frame-bars are round or partially round and whether solid or hollow, and no change of said fastener is required for harrows having any kind of frame-bars with a curved surface to which it is desired to attach a spike-tooth. Broadly, my invention consists in the means herein set forth for securing a spike-tooth to the curved surface of any frame-bar of a harrow.

It is observed that the inner clip 3 tapers centrally, with its side boundary-lines substantially parallel with the faces of the groove that receives the harrow-tooth or with the harrow-tooth when it is in place, whereby said clip at its weakest point is reinforced and of full strength.

What I claim as my invention, and desire to secure by Letters Patent, is—

1. A fastener for spike-tooth harrows including a clip with a curved face and two centrally-tapering projections to partially surround the curved surface of a frame-bar of the harrow and which has a groove in its outer face to receive the tooth, and means for clamping the tooth against said clip and said clip against the frame-bar.

2. A fastener for spike-tooth harrows including a pair of clips with corresponding grooves in their adjacent faces to receive the tooth, one of said clips having a curved face to partially surround the curved surface of a frame-bar of the harrow, and means surrounding said clips for drawing the clips toward each other and clamping the whole against the frame-bar.

3. A fastener for spike-tooth harrows including a pair of clips with corresponding grooves in their adjacent faces to receive the tooth, one of said clips having a curved face to partially surround the curved surface of a frame-bar of the harrow, and a clamp that surrounds said clips and is adapted to extend through the frame-bar of the harrow, whereby the tooth is clamped between said clips and the whole is clamped to the side of the frame-bar.

4. In a harrow, the combination of a frame-bar having a curved surface, a clip with a curved inner face partially surrounding the curved surface of the frame-bar and having a vertical groove in its outer face, a spike-tooth fitting in such vertical groove, and a clamp connected with the frame-bar and surrounding the tooth, whereby the tooth is held against the clip and the whole secured against the frame-bar.

5. In a harrow, the combination of a frame-bar having a curved surface, a pair of clips with corresponding grooves in their adjacent faces, one of said clips having a curved face to partially surround the curved surface of the frame-bar, a spike-tooth fitting in the grooves between said clips, and means for drawing the clips toward each other and against the frame-bar.

6. In a harrow, the combination of a frame-bar having a curved surface, a pair of clips with corresponding grooves in their adjacent faces, one of said clips having a curved face that partially surrounds the curved surface of the frame-bar, a harrow-tooth fitting in the grooves between the clips, and a clamp that surrounds said clips and extends through the frame-bar, whereby the tooth is clamped between the clips and the whole secured to the curved surface of the frame-bar.

7. In a harrow, the combination of a frame-bar with a curved surface, a pair of clips with corresponding vertical grooves in their adjacent faces and with grooves or seats in the sides of said clips, one of said clips having a curved inner face that partially surrounds the curved surface of the frame-bar, a spike-tooth fitting in the grooves between the clips, and a staple-like clamp that extends through said frame-bar and around said clips fitting in the grooves or seats in the side thereof, whereby the parts are all clamped together.

8. In a harrow, the combination of a frame-bar having a curved surface, a pair of clips whose length is greater than the diameter of the frame-bar with corresponding vertical grooves in their adjacent faces, one of said clips having a curved inner face that partially surrounds the curved surface of the frame-bar, and a clamp that extends around said clips, whereby the parts are clamped together.

9. In a harrow, the combination with a frame-bar having a curved surface and a vertical groove in the curved side thereof, a clip having a curved inner surface that partially surrounds the curved surface of the frame-bar, and with a vertical groove in its outer face that cuts through the curved inner face of said clip, a spike-tooth fitting in the groove in the outer face of the clip, and a clamp about said tooth and clip that holds them on the frame-bar so that the angular corner of the tooth extends through said clip into the groove in the frame-bar, whereby the parts are held in place.

10. In a harrow, the combination with a pipe, a pair of clips with corresponding vertical grooves in their adjacent faces, the inner one of said clips having a curved face that partially surrounds said pipe, a spike-tooth fitting in the grooves between said clips, and a staple-shaped clamping-bolt with its central portion surrounding the clips and its two ends extending centrally through said pipe and threaded, and nuts on the threaded ends thereof for clamping and compressing all of said parts together.

In witness whereof I have hereunto affixed my signature in the presence of the witnesses herein named.

WILLIAM MONROE FRANK.

Witnesses:
M. C. BUCK,
V. H. LOCKWOOD.